United States Patent
Leitner et al.

(10) Patent No.: US 6,702,367 B2
(45) Date of Patent: Mar. 9, 2004

(54) UTILITY VEHICLE COMPROMISING A DRIVER'S CAB WITH AN ELASTIC SUSPENSION

(75) Inventors: Martin Leitner, Behamberg (AT); Rudolf Bramberger, Behamberg (AT); Alois Arnberger, Steyr (AT); Remco Klunder, Steyr (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 0 days.

(21) Appl. No.: 10/239,453
(22) PCT Filed: Mar. 20, 2001
(86) PCT No.: PCT/AT01/00078
§ 371 (c)(1), (2), (4) Date: Jan. 21, 2003
(87) PCT Pub. No.: WO01/70560
PCT Pub. Date: Sep. 27, 2001

(65) Prior Publication Data
US 2003/0146647 A1 Aug. 7, 2003

(30) Foreign Application Priority Data
Mar. 20, 2000 (AT) ............................................. 456/2000

(51) Int. Cl.$^7$ ................................................ B62D 24/04
(52) U.S. Cl. .............................. 296/190.07; 296/190.05
(58) Field of Search ....................... 296/190.01, 190.04, 296/190.05, 190.07

(56) References Cited

U.S. PATENT DOCUMENTS

| | | | | |
|---|---|---|---|---|
| 4,438,970 A | * | 3/1984 | Boucher | 296/190.07 |
| 5,553,911 A | * | 9/1996 | Bodin et al. | 296/190.07 |
| 2003/0089541 A1 | * | 5/2003 | Sutton | 296/190.07 |

* cited by examiner

Primary Examiner—Jason Morrow
(74) Attorney, Agent, or Firm—Bachman & LaPointe, P.C.

(57) ABSTRACT

A driver's cab of a commercial vehicle is supported by at least one support (8; 9) on a frame (1) by spring struts (10; 20) and, by means of a pair of swinging arms (11; 21), is supported on bearings (15; 16;25; 26) fixed on the frame. One end of the swinging arms are connected in an articulated manner to the support.

6 Claims, 3 Drawing Sheets

UTILITY VEHICLE COMPROMISING A DRIVER'S CAB WITH AN ELASTIC SUSPENSION

This application is the National Stage of International Application PCT/AT01/00078 filed on Mar. 20, 2001.

BACKGROUND OF THE INVENTION

The invention relates to a commercial vehicle, the driver's cab of which is connected in a movable and cushioned manner to the frame of the commercial vehicle, at least one support of the driver's cab, which support is arranged in a transverse plane to the direction of travel, being supported on the frame and, by means of a pair of swinging arms arranged essentially in this transverse plane, being supported on bearings fixed on the frame, one end of the swinging arms being connected in an articulated manner to the support.

The movable and elastic suspension of the driver's cab is intended to keep distortions of the frame and vibrations away from the driver's cab and, nowadays especially, to increase the comfort of the occupants. This includes the absorption of vertical bumps, hence the elastic suspension, and furthermore the guidance in the longitudinal and transverse directions and the prevention of rolling movements (rotation about the longitudinal axis of the vehicle) of the driver's cab, especially when cornering. For the latter, the center of gravity of the driver's cab should be situated as close as possible to the roll center or, if considered three-dimensionally, to the roll axis.

A suspension according to the generic type of the driver's cab is known from practice. In this case, the swinging arms form a four-bar linkage with the frame as base and the support of the driver's cab as coupler. If the driver's cab executes a rolling movement with respect to the frame, then the roll center is situated in the imaginary intersecting point of the two swinging arms. The spring struts counteract the rolling movement. A compression of the driver's cab in the vertical direction is, strictly speaking, impossible with the kinematics of a four-bar linkage. However, it is possible in practice by means of rubber-elastic elements between the swinging arms and the base or the web, as long as the displacements to be absorbed by the rubber-elastic elements are not too large. In order to keep them small, the swinging arms have to be arranged approximately horizontally. Their imaginary intersecting point, the roll center, is then situated very low down, far below the center of gravity of the driver's cab. In spite of displacements being small, the rubber-elastic elements are susceptible to wear.

It is known from EP 426 510 A1, with a four-bar linkage being avoided, to contain the rolling movement of the driver's cab by means of a dedicated roll-damping means and to leave the lateral guidance of the driver's cab to a Panhard rod. The roll-damping means comprises two angle levers which are articulated on the frame and the first limbs of which are connected to one another via a roll damper and the second limbs of which, which face in the same direction, are connected to the support of the driver's cab. When rolling occurs, the two first limbs thus move in opposite directions. Since, however, the roll center is situated in the intersecting point of the Panhard rod with the longitudinal central plane of the vehicle, it is once again a good distance below the center of gravity of the driver's cab.

The aim object of the invention is thus to improve the suspension of the driver's cab in such a manner that the roll center is situated in the center of gravity of the driver's cab, in a simple manner and with the space required and with wear being as small as possible. Overall, the comfort of the driver's cab is to be noticeably improved at the lowest possible cost.

SUMMARY OF THE INVENTION

According to the invention, is the foregoing object is achieved in that:

a) the other end of the swinging arms is supported in each case on a first articulation point of a first and of a second deflecting lever, which deflecting levers are mounted in the respective bearing in a manner such that they can pivot in the transverse plane, and which have a second articulation point, b) the second articulation points of the first and of the second deflecting lever are connected to one another by means of an articulated transverse rod, c) the first deflecting lever is a one-armed lever, the second articulation point of which is situated on one side of an imaginary connecting line between the bearings fixed on the frame, and d) the second deflecting lever is a two-armed lever, the second articulation point of which is situated on the other side of an imaginary connecting line between the bearings fixed on the frame.

The deflecting levers, which are provided between swinging arms and frame, and the transverse rod permit the kinematically correct vertical movement of the driver's cab with precise lateral guidance. The articulation points of the transverse rod on both sides of the imaginary connecting line, in other words their diagonal arrangement, ensure that the first articulation points of the deflecting levers are always the same height and fixed laterally. As result, the angle of the swinging arms can be selected in such a manner that their imaginary intersecting point is situated in the center of gravity of the driver's cab. Therefore, centrifugal forces cannot lead to rolling of the driver's cab. In this manner, the transverse acceleration forces are isolated. However, because of the correct kinematics, the swinging arms can also be of very short design, which makes their installation possible even in a small installation space.

In one possible embodiment, the articulated connection of the swinging arm to the support of the driver's cab is situated above the first articulation point and closer to the center of the vehicle. This is advantageous for the front suspension of the driver's cab, which is to be situated as low down as possible. This is particularly applicable if, in a development, the support of the driver's cab accommodates the tilting axle, which lies transversely to the direction of travel, for tilting the driver's cab.

In another possible embodiment, the articulated connection of the swinging arm to the support of the driver's cab is situated below the first articulation point and is further away from the center of the vehicle. This embodiment is advantageous for the rear suspension of the driver's cab, particularly if it is a vehicle with a centrally positioned engine, in which the suspension has to bridge the latter.

In an expedient development for vehicles having a tiltable driver's cab, the articulated connection of the swinging arm to the support of the driver's cab can be released for tilting the driver's cab.

Finally, it is within the scope of the invention to arrange the spring struts between the swinging arm and the frame. The former is used for absorbing longitudinal forces acting on the driver's cab, the second for saving on space and for the kinematic influencing of the spring characteristics.

BRIEF DESCRIPTION OF THE DRAWINGS

The invention will be described and explained below with reference to figures, in which.

DETAILED DESCRIPTION

Figure 1:
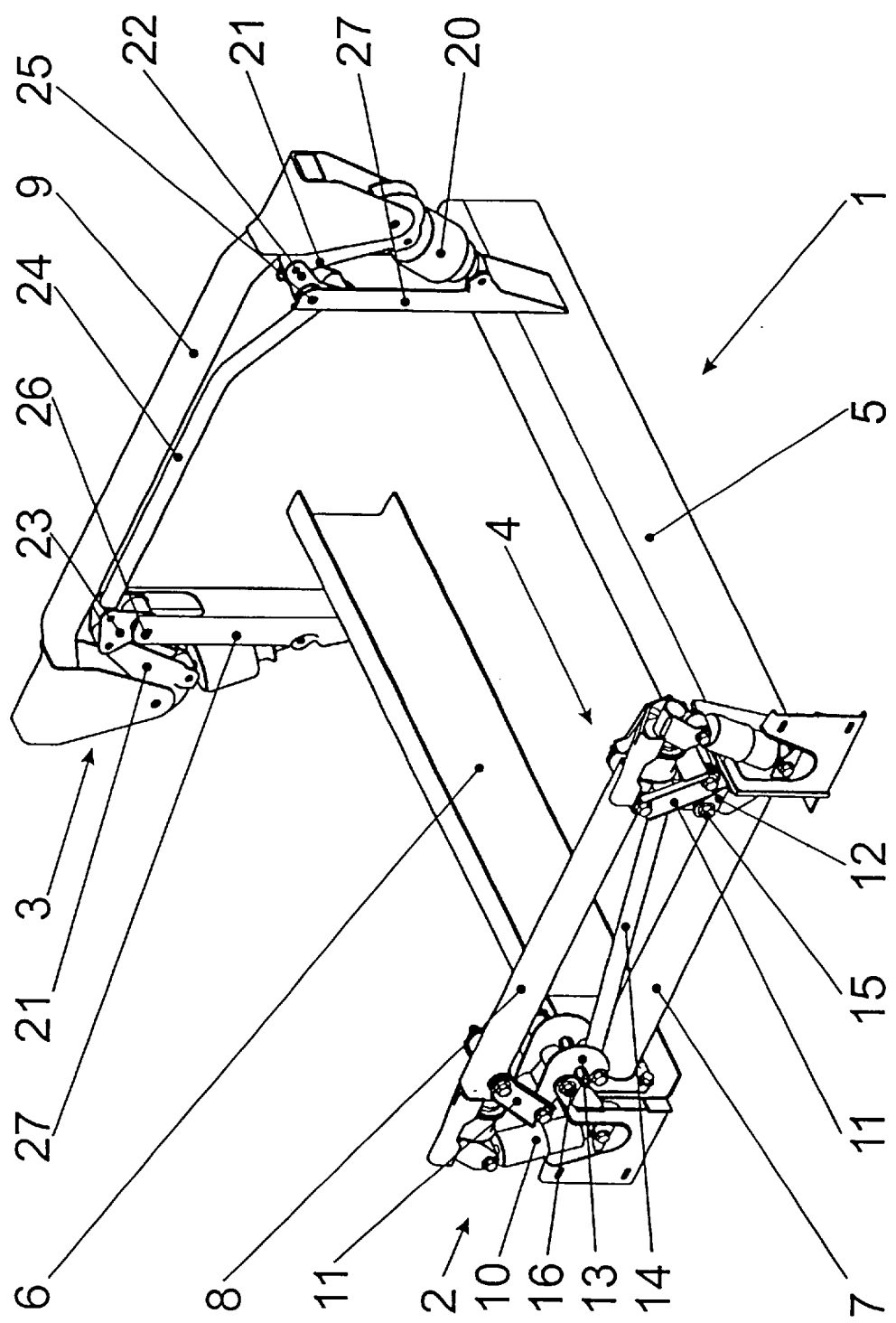
FIG. 1 shows part of the frame of a vehicle according to the invention together with the front and rear suspension of the driver's cab, axonometrically.

In FIG. 1, the frame of the commercial vehicle according to the invention is denoted overall by 1, the front suspension of a driver's cab by 2 and the rear suspension by 3. An arrow 4 specifies the direction of travel of the vehicle, it points forward. The frame comprises a left 5 and a right 6 frame longitudinal member 5, 6 and a number of frame transverse members 7, one tubular one of which can be seen. Only a front support 8 and a rear support 9 of the driver's cab are depicted. The front support 8 can contain the tilting axle of a tiltable driver's cab or can be connected thereto. The rear support 9 of the driver's cab is connected fixedly to the driver's cab and comprises a locking device, in the case of a tiltable driver's cab. However, a locking device of this type could also be provided between the support 9 and the floor of the driver's cab or in the swinging arm 21.

The front suspension 2 has on each side a spring strut 10 which can be combined in a known manner with a damping device. The frame 8 of the driver's cab is connected via swinging arms 11 and deflecting levers 12, 13 to bearings 15, 16 fixed on the frame. The left deflecting lever 12 differs from the right deflecting lever 13, and the two deflecting levers are connected to a diagonal transverse rod 14.

The rear suspension 3 is formed, together with the spring struts 20, by swinging arms 21 which are supported via deflecting levers 22, 23, which are again different and are connected to a transverse rod 24, on bearings 25, 26 fixed on the frame. The latter are arranged here above the frame longitudinal members 5, 6, for which purpose uprights 27 are attached fixedly to the latter. These uprights can be used to bridge an engine transmission unit (not illustrated) of the vehicle, if said unit is arranged below the rear part of the driver's cab.

Figure 2:
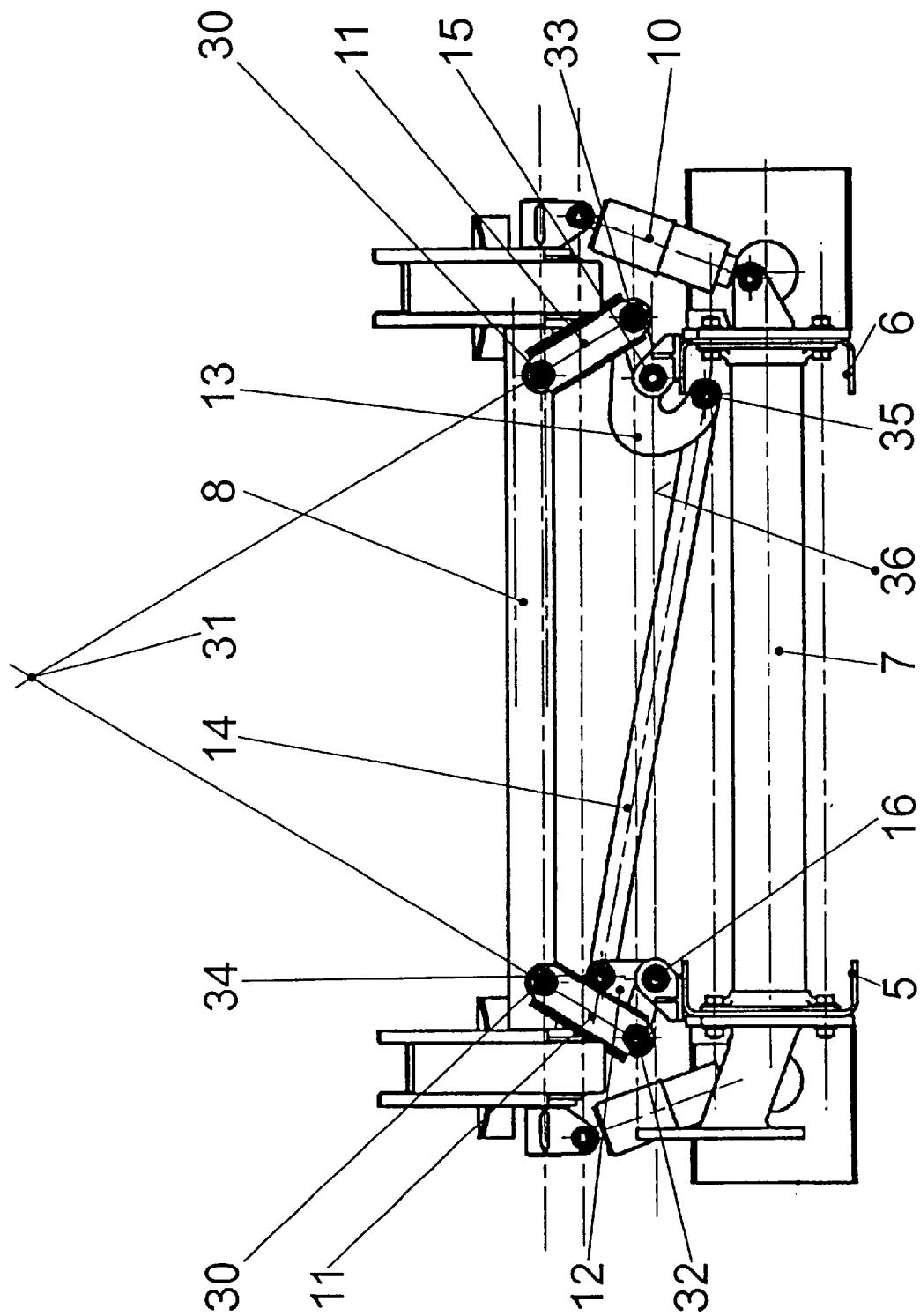
FIG. 2 shows the front suspension of the driver's cab, as seen in the direction of travel.

FIG. 2 shows the front suspension 2 in such a manner that the kinematics can be seen better. One end 30 of the swinging arms 11 is connected in an articulated manner to the support 8. The roll center 31 is situated in the intersecting point of the swinging arms 11, considerably above the support 8 of the driver's cab, in the vicinity of the center of gravity thereof. The left deflecting lever 12 has a first articulation point 32 for the other end of the swinging arm 11. The right deflecting lever 13 has a first articulation point 33 for the other end of the swinging arm 11. The ends 30 are situated higher and closer to the center of the vehicle than the first articulation points 32, 33. The intersecting point of the imaginary connecting lines of the points 30 and 32 or 33 is the roll center 31 of the driver's cab.

A second articulation point 34 of the left deflecting lever 12 is connected to a second articulation point 35 of the right deflecting lever 13 via a transverse rod 14. The two deflecting levers 12, 13 are mounted on the frame 1 in bearings 15, 16 fixed on the frame. Their imaginary connecting line is denoted by 36. The left deflecting lever 12 is a one-armed lever, the right (13) is a two-armed lever. As a result, the two second articulation points 34, 35 are situated one on one side of the connecting line 36 and the other on the other side thereof.

As long as this "diagonal" position of the transverse rod 14 is given, the shape of the deflecting levers 12, 13 can be varied within wide limits. The diagonally arranged transverse rod 14 has the effect that simultaneous vertical movements of the two articulation points 32, 33 are not obstructed and act only on the spring struts 10, but that a movement of the deflecting levers 12, 13 cannot take place if lateral forces are in action, so that the first articulation points 32, 33 are virtually unmovable in this case of loading.

Figure 3:
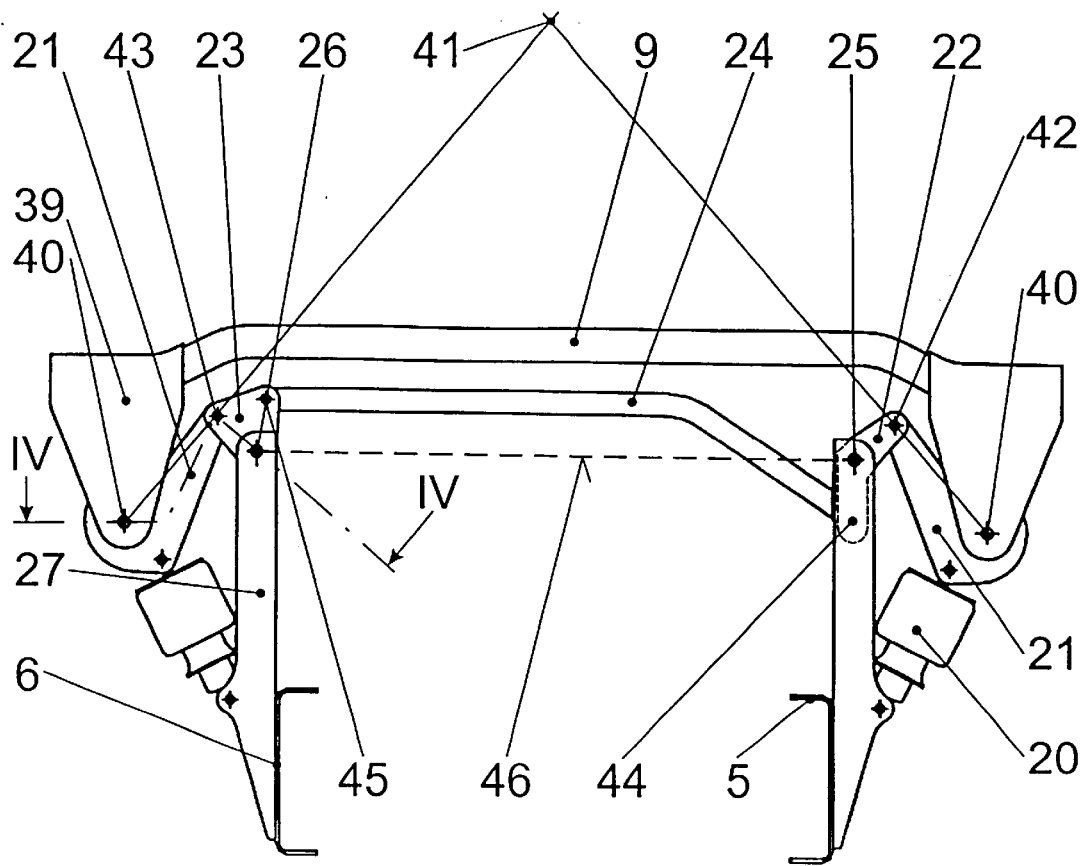
FIG. 3 shows the rear suspension of the driver's cab, as seen counter to the direction of travel.

FIG. 3 shows the rear suspension 3. The rear support 9 of the driver's cab has downwardly directed struts 39 on which one end of a swinging arm 21 is mounted pivotably on both sides at 40. The other end of the swinging arm is articulated on the left side in a first articulation point 42 of the left deflecting lever 22, on the right side in a first articulation point 43 of the right deflecting lever 23. The points 40 are situated lower down here than the first articulation points 42, 43 and are further away from each other. This produces the roll center 41, again in an imaginary extension of the swinging arms 21. The deflecting levers 22, 23 each have a second articulation point 44 and a second articulation point 45. Said articulation points are again connected to a transverse rod 24 which is slightly angled here. The two deflecting levers 22, 23 can again be pivoted in bearings 25, 26 fixed on the frame. For the design thereof and for the bearings of the second articulation points 44, 45, the statements made with regard to FIG. 2 with regard to an imaginary connecting line 46 between the bearings 25, 26 are applicable.

Figure 4:
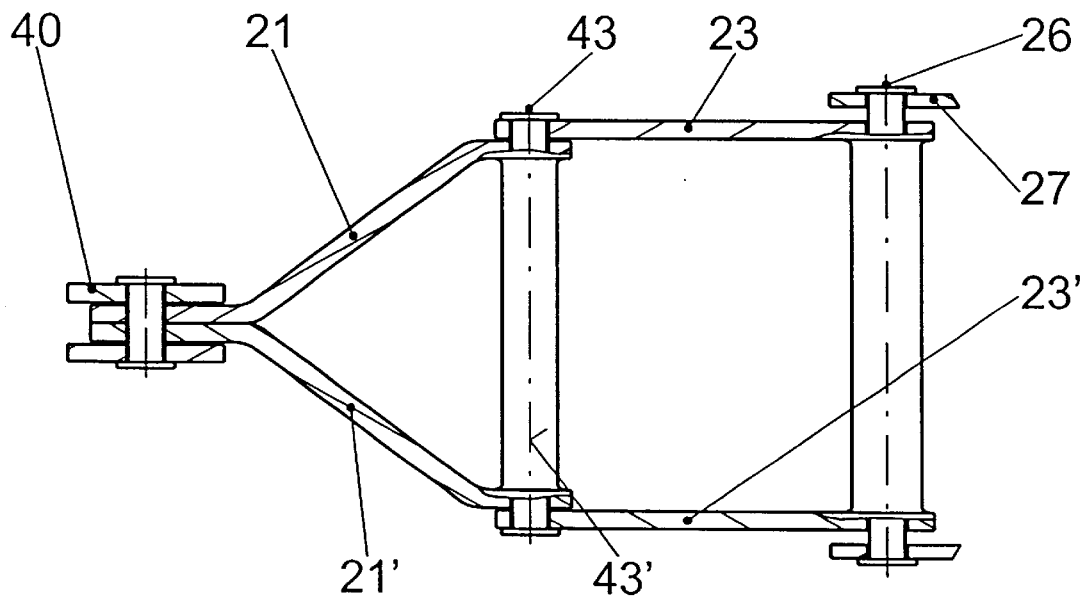
FIG. 4 shows a section according to IV—IV in FIG. 3, on an enlarged scale.

FIG. 4 illustrates in further detail that the swinging arms and deflecting levers are enlarged to longitudinally support the driver's cab. The swinging arm 21 thus obtains a secondary arm 21', in the manner of a wishbone, the first articulation point 43 is a swinging axis 43', the deflecting lever 23 is a three-dimensional element 23' and the bearing 26 which is fixed on the frame extends over the horizontal dimensions of the upright 27.

What is claimed is:

1. A commercial vehicle, the driver's cab of which is connected in a movable and cushioned manner to a frame of the commercial vehicle, at least one support (8;9) of the driver's cab, which of least one support is arranged in a transverse plane to the direction of travel, being supported on the frame (1) and, by means of a pair of swinging arms (11; 21) arranged essentially in this transverse plane, being supported on a plurality of bearings (15; 16; 25; 26) fixed on the frame, one end of the swinging arms being connected in an articulated manner to the of least one support, that wherein:

a) the other end of the swinging arms (11; 21) is supported in each case on a first articulation point (32; 33; 42; 43) of a first deflecting lever (12; 22) and of a second deflecting lever (13; 23), wherein each of the deflecting levers (12, 13; 22, 23) are mounted in one of the bearings (15; 16; 25; 26) in a manner such that they can pivot in the transverse plane, and which have a second articulation point (34, 35; 44, 45), b) the second articulation points (34, 35; 44, 45) of the first deflecting lever (12; 22) and of the second deflecting lever (13; 23) are connected to one another by means of an articulated transverse rod (14; 24), c) the first deflecting lever (12; 23) is a one-armed lever, the second articulation point (34; 45) of which is situated on one side of an imaginary connecting line (36; 46) between the plurality of bearings (15 16: 25 26) fixed on the frame, and d) the second deflecting lever (13; 22) is a two-armed lever, the second articulation point (35; 44) of which is situated on the other side of an imaginary connecting line (36; 46) between the plurality of bearings (15 16, 25, 26) fixed on the frame.

2. The commercial vehicle as claimed in claim 1, wherein an articulated connection (30) of the swinging arm (11) to the at least one support (8) of the driver's cab is situated above the first articulation point (32; 33) and closer to the center of the vehicle.

3. The commercial vehicle as claimed in claim 2, wherein the at least one support (8) of the driver's cab accommodates a tilting axle, which lies transversely to the direction of travel, for tilting the driver's cab.

4. The commercial vehicle as claimed in claim 1, wherein an articulated connection (40) of the swinging arm (21) to the at least one support (9) of the driver's cab is situated below the first articulation point (42; 43) and is further away from the center of the vehicle.

5. The commercial vehicle as claimed in claim 4, wherein the articulated connection of the swinging arm (21) to the at least one support (9, 39) of the driver's cab can be released for tilting the driver's cab.

6. The commercial vehicle as claimed in claim 1, wherein spring struts (20) are arranged between the swinging arm (21) and the frame (1).

\* \* \* \* \*